United States Patent [19]

Ona et al.

[11] Patent Number: 5,073,275

[45] Date of Patent: Dec. 17, 1991

[54] FIBER-TREATMENT AGENT

[75] Inventors: Isao Ona; Masaru Ozaki; Hidetoshi Kurusu, all of Chiba, Japan

[73] Assignee: Toray Silicone Company, Ltd., Tokyo, Japan

[21] Appl. No.: 357,760

[22] Filed: May 26, 1989

[30] Foreign Application Priority Data

May 26, 1988 [JP] Japan .................................. 63-129086

[51] Int. Cl.$^5$ ........................ D06M 10/08; C07F 7/04
[52] U.S. Cl. ........................................ 252/8.6; 8/115.6; 8/927; 252/8.8; 252/8.9; 556/413; 556/425
[58] Field of Search ..................... 252/8.8, 8.6, 8.9; 8/115.6

[56] References Cited

U.S. PATENT DOCUMENTS

| | | | |
|---|---|---|---|
| 3,751,321 | 8/1973 | Redmore et al. | 252/8.8 |
| 3,983,272 | 9/1976 | Huber et al. | 252/8.6 |
| 4,171,267 | 10/1979 | McAfee et al. | 252/8.6 |
| 4,247,592 | 1/1981 | Kalinowski . | |
| 4,311,626 | 1/1982 | Ona | 252/8.8 |
| 4,359,545 | 11/1982 | Ona et al. | 252/8.8 |
| 4,399,247 | 8/1983 | Ona et al. | 252/8.8 |
| 4,419,391 | 12/1983 | Tanaka et al. | 252/8.8 |
| 4,456,542 | 6/1984 | Wager et al. | 252/8.6 |
| 4,541,936 | 9/1985 | Ona et al. | 252/8.8 |
| 4,585,563 | 4/1986 | Busch et al. | 252/8.8 |
| 4,639,321 | 1/1987 | Barrat et al. | 252/8.8 |
| 4,757,121 | 7/1988 | Tanaka et al. | 252/8.6 |
| 4,830,845 | 5/1989 | Ogawa et al. | 8/115.6 |

*Primary Examiner*—Paul Lieberman
*Assistant Examiner*—William S. Parks
*Attorney, Agent, or Firm*—George A. Grindahl

[57] ABSTRACT

A composition and method for treating fibers is based on an organopolysiloxane having at least one cyclohexylamino-substituted hydrocarbon radical directly bonded to a silicon atom. The composition and method provide non-yellowing fibers and a treatment agent that does not gel during use, such as when exposed to carbon dioxide and/or used to treat carbon fibers.

16 Claims, No Drawings

FIBER-TREATMENT AGENT

BACKGROUND OF THE INVENTION

The present invention relates to a fiber-treatment agent. Fiber-treatment agents based on organopolysiloxane containing groups with the formula —$CH_2CH_2CH_2NHCH_2CH_2NH_2$ have been used in order to impart lubricity to fibrous materials composed of natural fibers such as cotton, flax, silk, wool, angora, and mohair; regenerated fibers such as rayon and Bemberg; semisynthetic fibers such as acetate; and synthetic fibers such as polyesters, polyamides, polyacrylonitriles, polyvinyl chlorides, Vinylon, polyethylenes, polypropylenes, and Spandex (refer to Japanese Patent Publication Number 57-43673 (43,673/82)). However, fibers treated with such an organopolysiloxane are subject to yellowing due to a spontaneous oxidation occurring with time. Moreover, when a continuous lubrication using rollers is carried out from a bath containing such an organopolysiloxane lubricant, moisture and carbon dioxide are absorbed from the atmosphere, a white turbidity appears in the bath, and the precipitation of a gel occurs. In addition, when such an organopolysiloxane is used for high-temperature oiling or lubrication as in the treatment of carbon fiber, for example, polyacrylonitrile-based carbon fiber, the organopolysiloxane is degraded to a gum, which sticks on the rollers, etc. This has the unfortunate effect of causing the fiber to snap.

BRIEF SUMMARY OF THE INVENTION

The present invention, having as one of its objects a solution to the aforementioned problems, introduces a fiber-treatment agent which not only imparts excellent lubrication, but which also does not yellow the fibrous material and is not subject to gelation or gum formation or the development of white turbidity during storage, heating, or treatment.

The aforesaid object is achieved by means of a fiber-treatment agent characteristically comprising (A) 100 to 0.1 weight percent of an organopolysiloxane with the general formula

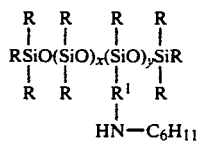

where, in the formula, R is a monovalent hydrocarbon group, $R^1$ is a divalent hydrocarbon group, —$C_6H_{11}$ is a cyclohexyl group, x=200 to 2,000, and y=1 to 100; and (B) 0 to 99.9 weight percent polydiorganosiloxane which does not contain nitrogen atom-substituted monovalent hydrocarbon groups.

DETAILED DESCRIPTION OF THE INVENTION

Comparison Example

To explain the preceding in greater detail, component (A) is an organopolysiloxane with the following general formula

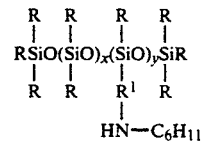

In this formula, R is a monovalent hydrocarbon group, as exemplified by alkyl groups such as methyl, ethyl, propyl, and butyl; substituted alkyl groups such as 2-phenylethyl, 2-phenylpropyl, and 3,3,3-trifluoropropyl; alkenyl groups such as vinyl, propenyl, and butadienyl; cycloalkyl groups such as cyclohexyl, also designated herein as —$C_6H_{11}$; and aryl and substituted aryl groups such as phenyl, tolyl, xenyl, and naphthyl, with the proviso that nitrogen atom-substituted monovalent hydrocarbon groups are excluded from R. Alkyl, alkenyl, and aryl groups are preferred. Furthermore, within a single molecule, R may be only a single species or may comprise different species.

$R^1$ is a divalent hydrocarbon group, and examples in this regard are methylene, n-propylene, n-butylene, isopropylene, and phenylene. The numerical value of x ranges from 200 to 2,000, and of y ranges from 1 to 100. When x does not fall within the range of 200 to 2,000, a superior lubricity cannot be imparted to the fibrous material. Also, it is economically disadvantageous for y to exceed 100. It is preferred that y/(x+y) fall within the range of 0.5 to 5.0 percent.

The organopolysiloxane under consideration can be obtained by a dehydrochlorination reaction between cyclohexylamine and haloalkyl group-containing organopolysiloxane such as that illustrated, for example, by the following formula.

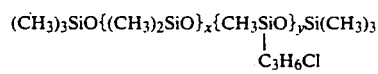

The blending or admixture of component (B), organopolysiloxane not containing a nitrogenous movalent hydrocarbon group, has the effect of stabilizing the lubricating properties of the fiber-treatment agent at both low and high speeds.

A typical example of such an organopolysiloxane has the general formula

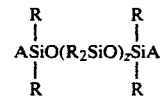

in which R is defined as above. The group A comprises a group R or the hydroxyl group, while z is an integer with a value of at least 8. In a preferred embodiment R is an alkyl group, and z is a number such that the viscosity at 25 degrees Centigrade has a value of 10 to 100,000 centistokes.

The fiber-treatment agent of the present invention comprises the blend of 100 to 0.1 weight percent component (A) with zero to 99.9 weight percent component (B). Preferred proportions are 99.9 to 0.1 weight percent component (A) and 0.1 to 99 9 weight percent component (B), while 20 to 5 weight percent component (A) and 80 to 95 weight percent component (B) is particularly preferred.

While the fiber-treatment agent of the present invention can be directly adhered as such on fibrous materials, treatment may also be conducted with it dissolved in an organic solvent, for example, toluene, xylene, benzene, n-hexane, heptane, acetone, methyl ethyl ketone, methyl isobutyl ketone, ethyl acetate, butyl acetate, mineral turpentine, perchloroethylene, trichloroethylene, etc. Also, treatment may be conducted with it emulsified using a cationic or nonionic surfactant.

Examples of cationic surfactants in this regard are quaternary ammonium hydroxides (and salts thereof) such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, didodecyldimethylammonium hydroxide, dioctadecyldimethylammonium hydroxide, beef tallow trimethylammonium hydroxide, and cocotrimethylammonium hydroxide.

Examples of nonionic surfactants in this regard are polyoxyalkylene alkyl ethers, polyoxyalkylene alkylphenol ethers, polyoxyalkylene alkyl esters, polyoxyalkylene sorbitan alkyl esters, polyethylene glycols, polypropylene glycols, and diethylene glycol.

Furthermore, the fiber-treatment agent of the present invention may also contain other additives as known to the art, such as antistatics, softeners, creaseproofing agents, heat stabilizers, flame retardants, etc.

The fibrous material can be treated using methods such as spray adhesion, roll application, brushing, immersion, dipping, etc. The add-on or uptake quantity will vary with the fibrous material and thus cannot be rigorously specified; however, in general it will fall within the range of 0.01 to 10.0 weight percent as organopolysiloxane fraction based on fibrous material. The fibrous material is then allowed to stand at the ambient temperature and/or is subjected to a hot air stream and/or is heat treated.

The fibrous material may be composed of, for example, natural fiber such as wool, silk, flax, cotton, angora, mohair, and asbestos; regenerated fiber such as rayon and Bemberg; semisynthetic fiber such as acetate; synthetic fiber such as polyesters, polyamides, polyacrylonitriles, polyvinyl chlorides, Vinylon, polyethylenes, polypropylenes, and Spandex; and inorganic fiber such as glass fibers, carbon fibers, and silicon carbide fibers. It may take the form of, for example, the staple, filament, tow, top, or yarn, and in its structure may be, for example, a weave, knit, or nonwoven fabric.

The fiber-treatment agent of the present invention finds use in particular as a carbon fiber-treatment agent for polyacrylonitrile-based, rayon-based, and pitch-based carbon fibers.

EXAMPLES

The present invention is explained in greater detail, but not limited, in the following by illustrative examples. In the examples, unless specified otherwise, %=weight percent, and the viscosity is the value measured at 25 degrees Centigrade.

EXAMPLE 1

Organopolysiloxane, 40 grams, (viscosity=1,080 centistokes) with the structure

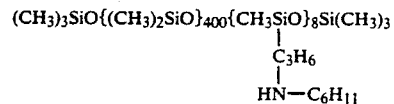

and 360 g trimethylsiloxy-terminated polydimethylsiloxane (viscosity=200 centistokes) were mixed to homogeneity to prepare a treatment liquid A. 200 g of this treatment liquid A was placed in a 500 cc beaker, a four-blade stirrer was set in, and it was stirred for 10 or 20 hours at 100 rpm in order to investigate the stability as a bath for the straight lubrication of sewing machine thread. The results were evaluated on the following scale.

+ = Transparent, without white turbidity in the bath; little precipitation of gel upon quiescence; excellent as a bath for straight lubrication of sewing machine thread.

0 = Slight white turbidity in bath, slight gel precipitation also observed.

x = Substantial white turbidity in bath, substantial gel precipitation can be observed upon quiescence.

Using the other 200 g of treatment liquid A, a 6% add-on (based on thread) was uniformly applied to raw sewing machine thread (100% polyester spun yarn). The sewing machine thread thus treated was subjected to a measurement of its kinetic coefficient of friction ($\mu_k$) under the following conditions using an instrument for measuring the kinetic coefficient of friction of yarn from Dai-ei Kagaku Seiki Seisaku-jo:

sample length:20 cm
drum:stainless steel
thread velocity (m/minute):1.0 and 6.0.

In the comparison examples, treatment liquids B and C as below were used for treatment as above.

TREATMENT LIQUID B

Comparison Example

Trimethylsiloxy-terminated polydimethylsiloxane (viscosity=200 centistokes)

TREATMENT LIQUID C

Comparison Example

This is a homogeneous mixed liquid of 95 g treatment liquid B and 10 g organopolysiloxane (viscosity=1,100 centistokes) with the following formula.

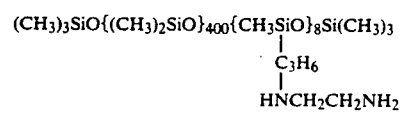

These results are reported in Table 1. The treatment liquid of the present invention was stable, without white turbidity or gel precipitation even after 20 hours, and the lubricity was excellent even at different thread velocities. It was therefore highly suitable as a treatment agent for sewing machine thread.

TABLE 1

|  |  | Stability of Sewing Machine Thread treatment bath | | Lubricity ($\mu_k$) | |
|---|---|---|---|---|---|
|  |  | stirring for 10 hours | stirring for 20 hours | thread velocity = 1 m/min | thread velocity = 6 m/min |
| Present Invention | treatment liquid A | + | + | 0.101 | 0.102 |
| Comparison Example | treatment liquid B | + | + | 0.120 | 0.129 |
| Comparison Example | treatment liquid C | O | x | 0.123 | 0.138 |
| Blank | no treatment agent | — | — | 0.270 | 0.373 |

EXAMPLE 2

The following treatment liquids D through H were prepared in order to investigate the high-temperature stability which is an essential property of lubricants for polyacrylonitrile-based carbon fibers. A 2g sample of each treatment liquid was placed in an aluminum cup (diameter=5 cm, depth=1.5 cm), and a gelation test was conducted by varying the time held at 150 degrees Centigrade. The results were evaluated as follows.

+ = Remains as an oil, almost no change in viscosity.

O = Substantial increase in viscosity, partial gel development.

x = No longer fluid, converted to a very sticky gel.

TREATMENT LIQUID D

Present Invention

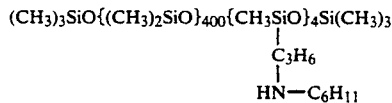

viscosity = 1,030 centistokes

TREATMENT LIQUID E

Comparison Example

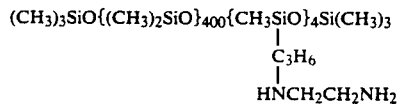

viscosity = 1,050 centistokes

TREATMENT LIQUID F

Comparison Example

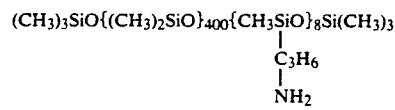

viscosity = 930 centistokes

TREATMENT LIQUID G

Comparison Example

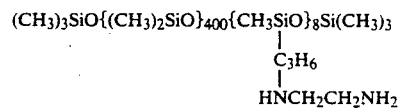

viscosity = 1,100 centistokes

TREATMENT LIQUID H

Comparison Example

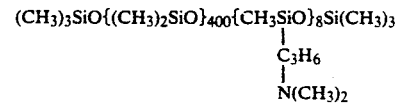

viscosity = 1,040 centistokes

These results are reported in Table 2. The treatment liquid of the present invention had an excellent heat resistance, and gelation was entirely absent even after 8 hours at 150 degrees Centigrade, thus confirming its strong suitability as a lubricant for carbon fibers.

TABLE 2

|  |  | Treatment Time in Hours | | | |
|---|---|---|---|---|---|
|  |  | 1 | 2 | 4 | 8 |
| Present Invention | Treatment liquid D | + | + | + | + |
| Comparison Example | Treatment liquid E | +-O | O | x | x |
| Comparison Example | Treatment liquid F | +-O | O | O-x | x |
| Comparison Example | Treatment liquid G | O | O-x | x | x |
| Comparison Example | Treatment liquid H | + | +-D | D | D |

EXAMPLE 3

A 2 g sample of each of treatment liquids D through H as used in Example 2 were placed in separate 500 cc beakers, and homogeneous solutions were prepared using 98 g toluene in each case. Hand-knitting yarn (polyacrylonitrile spun fiber, treated with fluorescent brightener, wound on a core) was immersed in each solution for 10 seconds and wrung out to an expression ratio of 50% on a squeeze roll to obtain an organopolysiloxane add-on of 1% in each case. After drying while suspended for 60 minutes at room temperature, it was wound uniformly around a 7 cm × 4 cm aluminum plate. It was subsequently subjected to a heat treatment for 15 minutes in an oven at 150 degrees Centigrade. The degree of yellowing was then evaluated and ranked using a discoloration/fading grey scale.

These results are reported in Table 3. The polyacrylonitrile hand-knitting yarn carrying the treatment agent of the present invention did not yellow and had an excellent lubricity.

TABLE 3

|  | Treatment liquid | Yellowing (rank) |
|---|---|---|
| Present Invention | D | 5 (no yellowing) |
| Comparison Example | E | 1-2 (substantially pronounced yellowing) |
| Comparison | F | 1-2 |

TABLE 3-continued

| | Treatment liquid | Yellowing (rank) |
|---|---|---|
| Example | | |
| Comparison Example | G | 1~2 |
| Comparison Example | H | 4 (slight yellowing) |

EFFECTS OF THE INVENTION

The present invention introduces a fiber-treatment agent Which can impart an excellent lubricity without causing the fibrous material to yellow, and which does not undergo gelation or gum formation or the development of white turbidity during storage, heating, or treatment.

That which is claimed is:

1. A fiber-treatment agent composition comprising
(A) 100 to 0.1 weight percent of an organopolysiloxane with the general formula

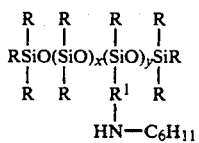

where, in the formula, R is a monovalent hydrocarbon group, $R^1$ is a divalent hydrocarbon group, $-C_6H_{11}$ is a cyclohexyl group, $x=200$ to 2,000, and $y=1$ to 100, and (B) 0 to 99.9 weight percent polydiorganosiloxane which does not contain nitrogen atom-substituted monovalent hydrocarbon groups.

2. A composition according to claim 1 wherein each R denotes a methyl group.

3. A fiber-treatment agent composition comprising
(A) 99.9 to 0.1 weight percent of an organopolysiloxane with the general formula

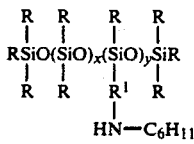

where, in the formula, R is a monovalent hydrocarbon group, $R^1$ is a divalent hydrocarbon group, $-C_6H_{11}$ is a cyclohexyl group, $x=200$ to 2,000, and $y=1$ to 100, and (B) 0.1 to 99.9 weight percent of a polydiorganosiloxane having the formula

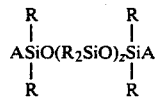

in which R is defined as above, A comprises an R group or the hydroxyl group and z has an average value of at least 8.

4. A composition according to claim 3 wherein each R denotes a methyl group.

5. A process for providing treated fibers, said process comprising treating said fibers with the fiber-treatment agent composition of claim 1.

6. A process for providing treated fibers, said process comprising treating said fibers with the fiber-treatment agent composition of claim 2.

7. A process for providing treated fibers, said process comprising treating said fibers with the fiber-treatment agent composition of claim 3.

8. A process for providing treated fibers, said process comprising treating said fibers with the fiber-treatment agent composition of claim 4.

9. A process according to claim 5 wherein the fiber is carbon fiber.

10. A process according to claim 6 wherein the fiber is carbon fiber.

11. A process according to claim 7 wherein the fiber is carbon fiber.

12. A process according to claim 8 wherein the fiber is carbon fiber.

13. A process according to claim 5 wherein the fiber is polyacrylonitrile spun fiber and the treated fiber is non-yellowing when heated at 150° C. in an oven for 15 minutes.

14. A process according to claim 6 wherein the fiber is polyacrylonitrile spun fiber and the treated fiber is non-yellowing when heated at 150° C. in an oven for 15 minutes.

15. A process according to claim 7 wherein the fiber is polyacrylonitrile spun fiber and the treated fiber is non-yellowing when heated at 150° C. in an oven for 15 minutes.

16. A process according to claim 8 wherein the fiber is polyacrylonitrile spun fiber and the treated fiber is non-yellowing when heated at 150° C. in an oven for 15 minutes.

* * * * *